United States Patent
Lo

(10) Patent No.: US 6,595,890 B2
(45) Date of Patent: Jul. 22, 2003

(54) TORSION SHIFT STRUCTURE FOR THE MEANS OF TRANSPORTATION

(76) Inventor: Chen-Chuan Lo, P.O. Box No. 6-57, Chung-Ho City, Taipei Hsien 235 (TW)

( * ) Notice: Subject to any disclaimer, the term of this patent is extended or adjusted under 35 U.S.C. 154(b) by 0 days.

(21) Appl. No.: 09/811,543

(22) Filed: Mar. 20, 2001

(65) Prior Publication Data

US 2002/0137588 A1 Sep. 26, 2002

(51) Int. Cl.$^7$ ................................................ F16H 37/08
(52) U.S. Cl. ...................... 475/198; 74/333; 192/48.91; 192/93 C
(58) Field of Search .................. 475/198, 203, 475/206; 74/333, 335; 192/93 C, 48.91

(56) References Cited

U.S. PATENT DOCUMENTS

| | | | | |
|---|---|---|---|---|
| 2,474,789 A | * | 6/1949 | Perhacs ........................ | 192/44 |
| 2,772,578 A | * | 12/1956 | Kling .......................... | 192/56.1 |
| 2,861,461 A | * | 11/1958 | Kreidler ....................... | 192/71 |
| 4,141,424 A | * | 2/1979 | Murayama et al. ........ | 180/53.2 |
| 4,343,612 A | * | 8/1982 | Blanchard .................... | 440/75 |
| 4,395,240 A | * | 7/1983 | Blanchard .................... | 440/86 |
| 4,400,163 A | * | 8/1983 | Blanchard .................... | 440/75 |
| 4,789,366 A | * | 12/1988 | Hale et al. ................... | 192/44 |

* cited by examiner

Primary Examiner—Christopher P. Schwartz
Assistant Examiner—Xuan Lan Nguyen
(74) Attorney, Agent, or Firm—Troxell Law Office PLLC

(57) ABSTRACT

The invention herein of a torsion shift structure for the means of transportation mainly comprises of a transmission gear axle mounted between the power gear axle and the selective speed gear axle of the transmission structure of the means of transportation; the transmission gear on the transmission gear axle meshes the selective speed gear axle; a high speed gear and a low speed gear are formed on the power gear axle; the first and the second shifting gears are housed on the transmission gear axle and mesh respectively the high and the low speed gears; furthermore, a shifting shaft rod is inserted through the transmission gear axle for respectively controlling the interlocking between the first and second shifting gears and the transmission gear axle to change the driving of the high and the low speed gears and the transmission gear axle and to further achieve the output of the torsion shifting.

1 Claim, 6 Drawing Sheets

TORSION SHIFT STRUCTURE FOR THE MEANS OF TRANSPORTATION

BACKGROUND OF THE INVENTION

1) Field of the Invention

The invention herein of a torsion shift structure for the means of transportation focuses on improving the transmission structure of the ordinary means of transportation so as to provide a transmission structure capable of stably transmitting the power of the power elements to the axles on both sides and of conducting in time the shifting of the torsion output to change the power output of the axle of the means of transportation and to further increase the applicability and convenience of the means of transportation.

2) Description of the Prior Art

As shown in FIGS. 1 to 3 of the transmission structure of the conventional means of transportation improved by the inventor of the invention herein as a researched and preferred transmission structure using the differential device to drive the wheel axle, wherein the entire transmission structure has a axle housing seat (1) as the main assembly body; the driving wheel bodies (44) mounted by the wheel axles (41, 42) on two sides are disposed respectively on the outer sides of the axle seats (11, 12) on the two ends of the axle housing seat (1); a differential gear set (2) is mounted inside the axle housing seat (1) for specifically transmitting the power generated by the power elements (3) mounted on the side of the axle housing seat (1) to the wheel axles (41, 42) for driving the means of transportation.

The differential gear set (2) has a main turning wheel (21) as the main body housed on one of the end portions of the wheel axle (41) through the axle hole (211) on the center and connected to the main moving axle of the power elements (3) through the power gear axle (23); housing seats (212) are mounted on the two sides of the axle hole (211) of the main turning wheel (21); two bevel gears (22) are opposite and lively housed in the housing seats (212); on the axle ends of the wheel axles (41, 42) on two sides, another two bevel gears (43) are fastened to mesh respectively the bevel gears (22) on the two sides of the main turning wheel (21); furthermore, the main tuning wheel (21) of the differential gear set (2) and the power gear axle (23) is connected by a selective speed gear axle (24); the distribution of the number of both the gear teeth on the selective gear (242) of the selective gear axle (24) meshing the power gear axle (23) and the gear teeth on the selective gear (241) meshing the main turning wheel (21) can make the main turning wheel (21) obtain the higher turning velocity or bigger torsion; according to the specifically applicative need of the means of transportation, the selective speed gear axle with different ratio of gear teeth can be selected for making variation.

However, although the device of differential gear set mentioned above can improve the shortcomings of the transmission for the conventional means of transportation, there is still space left for more improvement in terms of power output which is expected to be able to conduct the output of the torsion shift in time according to the need of the real road situation and the driving speed while the means of transportation is in use so as to enhance the torsion or the driving speed of the means of transportation and to make the means of transportation possess more applicability and convenience.

SUMMARY OF THE INVENTION

Therefore, the invention herein of a torsion shift structure for the means of transportation, with a transmission gear axle mounted between the power gear axle and the selective speed gear axle of the transmission structure of the means of transportation; the transmission gear on the transmission gear axle meshing the selective speed gear axle; a high speed gear and a low speed gear formed on the power gear axle; the first and the second shifting gears housed on the transmission gear axle and meshing respectively the high and the low speed gears; furthermore, a shifting shaft rod inserting through the transmission gear axle for respectively controlling the interlocking between the first and second shifting gears and the transmission gear axle, has the primary objective to change the driving of the high and the low speed gears and the transmission gear axle and to further achieve the output of the torsion shift.

Another objective of the invention herein of a torsion shift structure for the means of transportation is to have a press plate driven by the drag link and pivotally mounted on the outer side of the axle housing seat; through the direct pressure from the press plate against the shifting shaft rod, the operator can directly pull the drag link to achieve the effect of torsion shifting.

To enable a further understanding of the features and the innovation of the invention herein, the brief description of the drawings below is followed by the detailed description of the preferred embodiment.

DETAILED DESCRIPTION OF THE PREFERRED EMBODIMENTS

Figure 1:
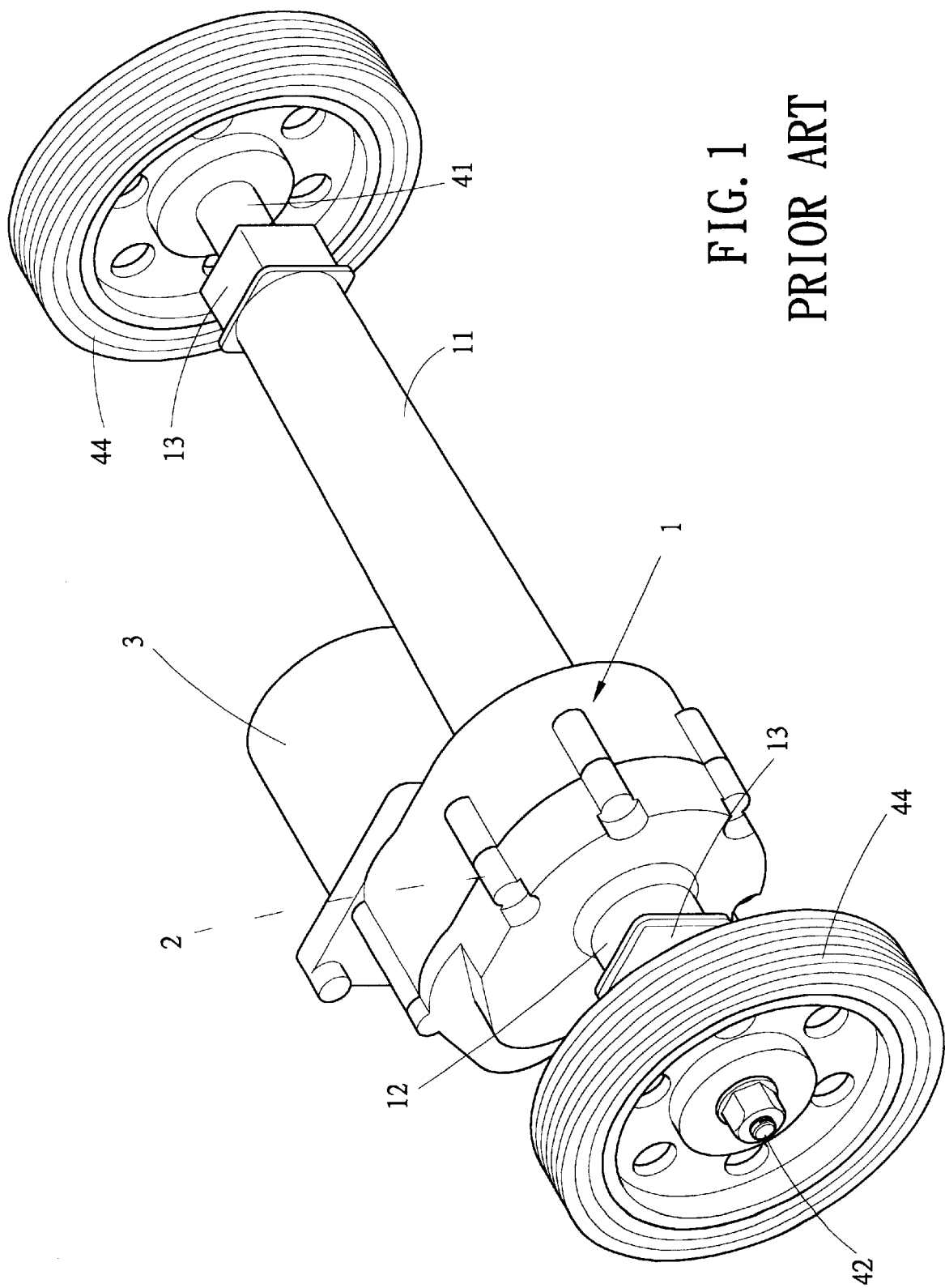
FIG. 1 is a drawing of the external view of the previous transmission structure of the means of transportation in embodiment of the inventor of the invention herein.
Figure 2:
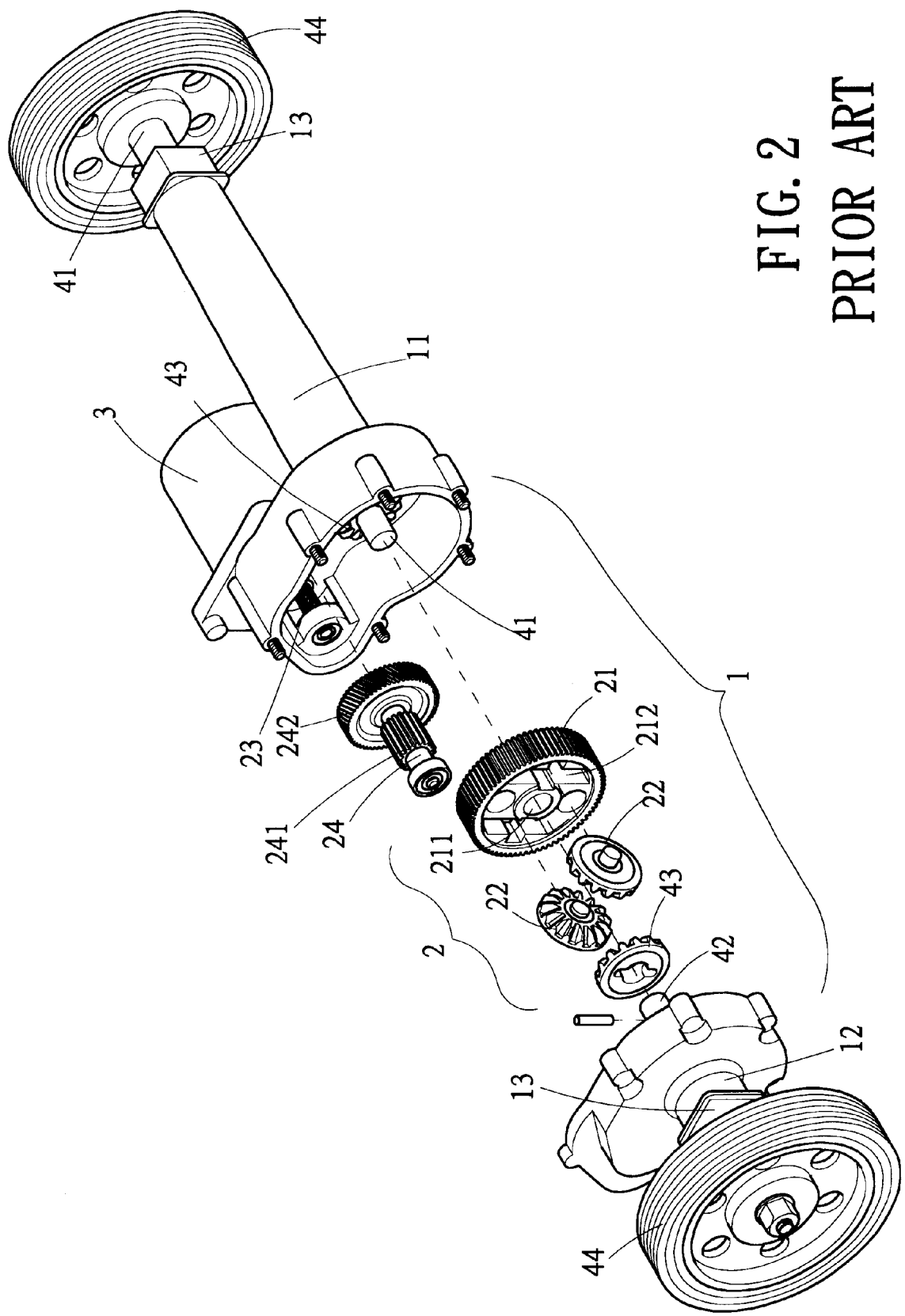
FIG. 2 is an exploded drawing of the previous transmission structure of the means of transportation in embodiment of the inventor of the invention herein.
Figure 3:
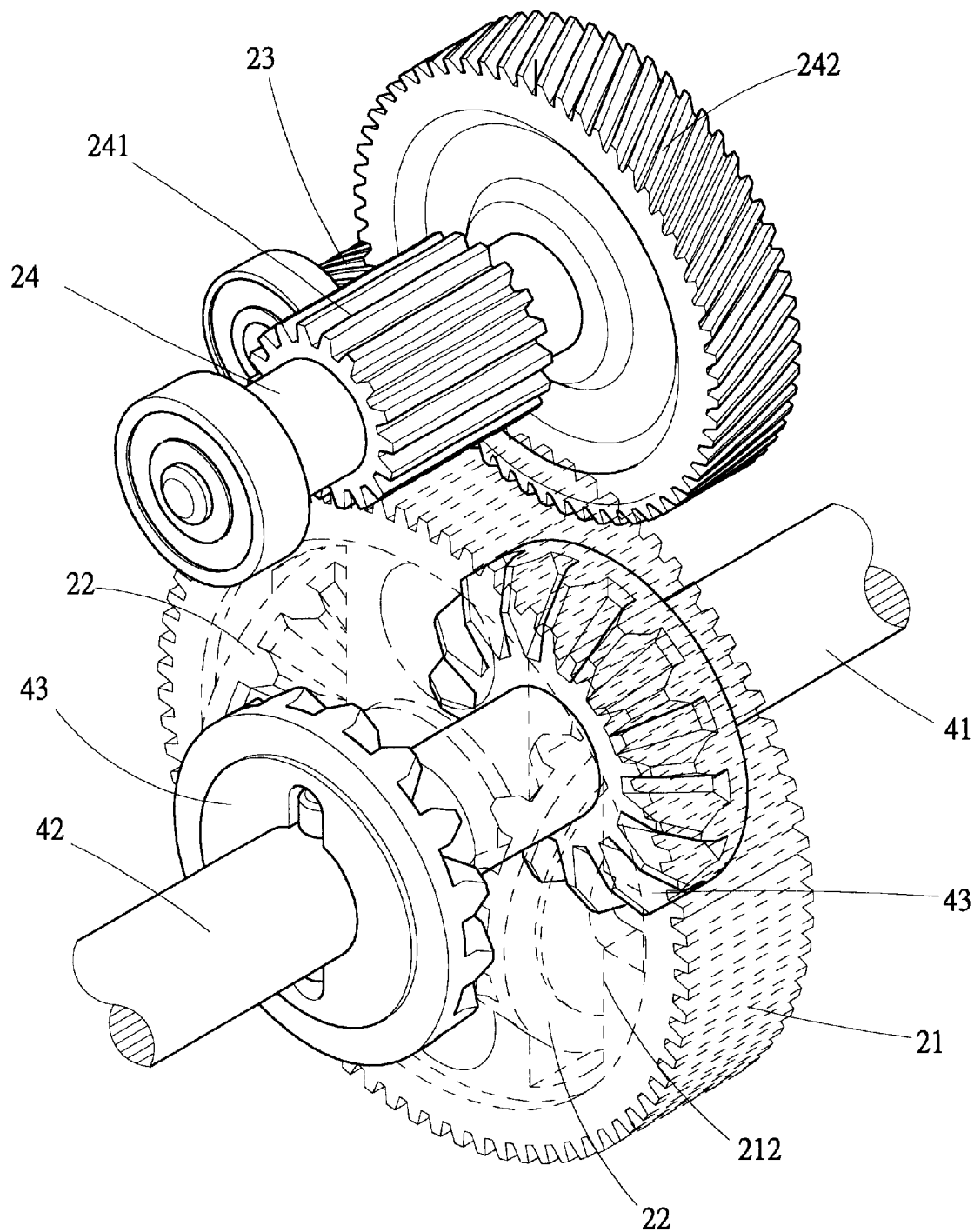
FIG. 3 is an isometric drawing of the previous transmission method of the differential gear set of the transmission structure of the means of transportation in embodiment of the inventor of the invention herein.
Figure 4:
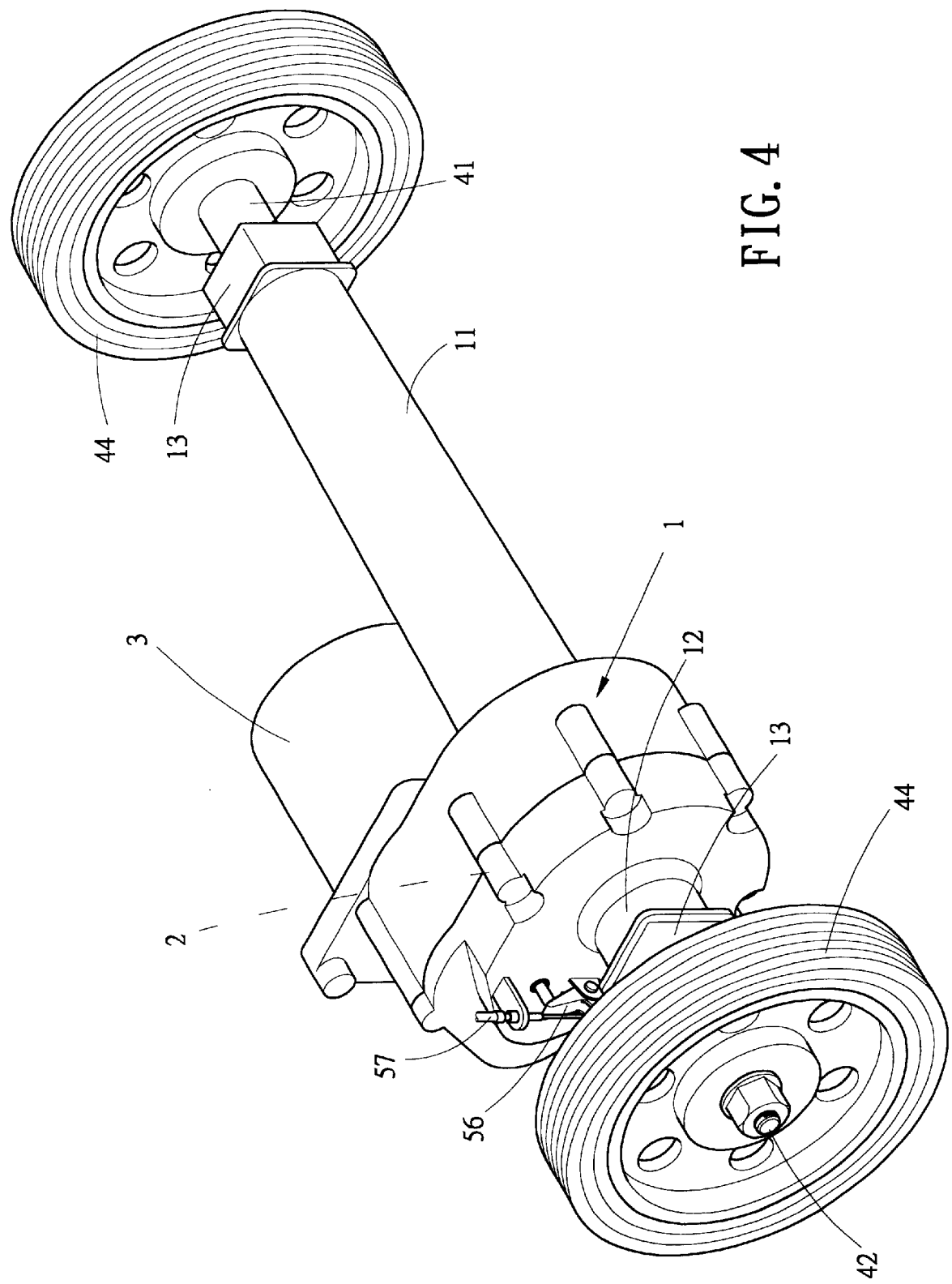
FIG. 4 is a drawing of the external view of the structure of the invention herein.
Figure 5:
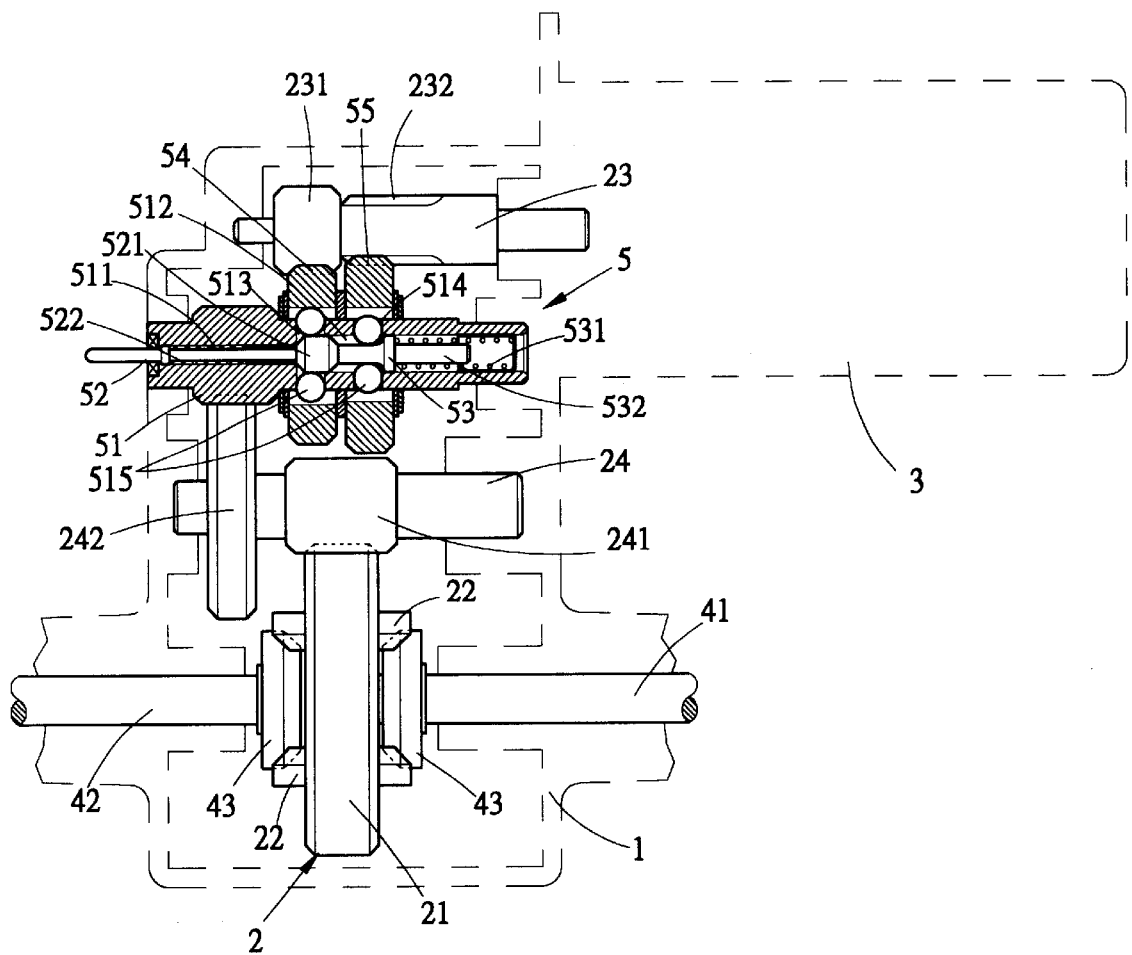
FIG. 5 is a sectional drawing of the structure of the invention herein.

The transmission structure in embodiment of the invention herein of a torsion shift structure for the means of transportation as shown in FIGS. 4 and 5, wherein the entire transmission structure has a axle housing seat (1) as the main assembly body; the driving wheel bodies (44) mounted by the wheel axles (41, 42) on two sides are disposed respectively on the outer sides of the axle seats (11, 12) on the two ends of the axle housing seat (1); a differential gear set (2) is mounted inside the axle housing seat (1) for specifically transmitting the power generated by the power elements (3) to the wheel axles (41, 42); the differential gear set (2) has a main turning wheel (21) as the main body connected to the main moving axle of the power elements (3) through the power gear axle (23); two bevel gears (22) are housed to the main turning wheel (21) to drive relatively the bevel gears (43) on the axle ends of the wheel axles (41, 42); furthermore, the main tuning wheel (21) of the differential gear set (2) and the power gear axle (23) is connected by a selective speed gear axle (24); the distribution of the number of both the gear teeth on the selective gear (242) of the selective gear axle (24) meshing the power gear axle (23) and the gear teeth on the selective gear (241) meshing the main turning wheel (21) can make the main turning wheel (21) obtain the higher turning velocity or bigger torsion.

The major features of the invention herein lie in that a transmission gear axle (5) is mounted between the said power gear axle (23) and the selective speed gear axle (24) with the transmission gear (51) on the transmission gear axle (5) meshing the selective speed gear (242) on the selective speed gear axle (24); furthermore, a high speed gear (231) and a low speed gear (232) formed on the said power gear axle (23) while on the said transmission gear axle (5), the first shifting gear (54) and the second shifting gear (55) are housed and mesh respectively the high speed gear (231) and the low speed gear (232); a shifting shaft rod (52) is inserted through the transmission gear axle (5) for respectively controlling the interlocking between the first and second shifting gears (54, 55) and the transmission gear axle (5) to change the driving of the high and the low speed gears (231, 232) and the transmission gear axle (5) and to further achieve the shifting of the torsion output; more especially, a press plate (56) driven by the drag link (57) is pivotally mounted on the outer side of the axle housing seat (1); through the direct pressure from the press plate (56) against the shifting shaft rod (52), the operator can directly pull the drag link (57) to achieve the effect of torsion shifting.

Figure 6:
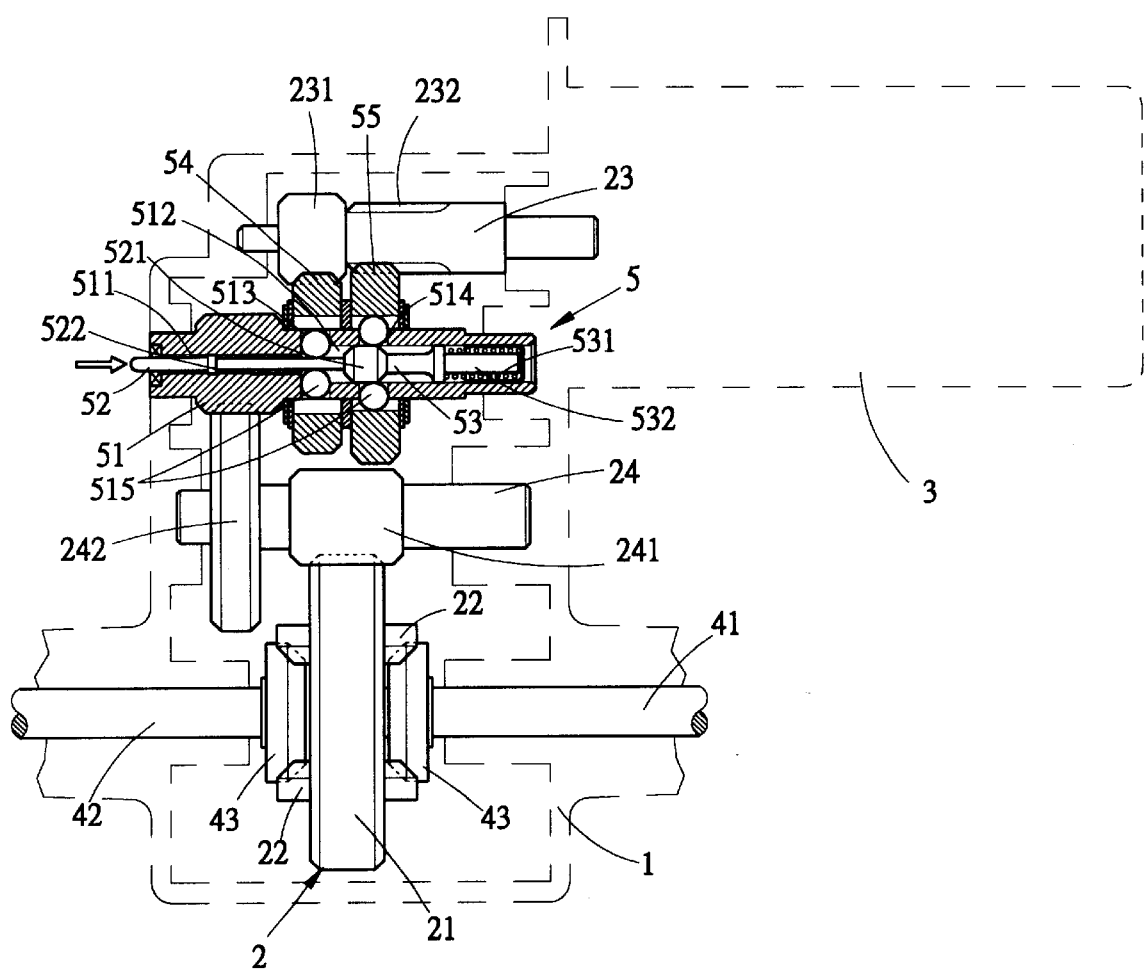
FIG. 6 is an isometric drawing of the torsion shifting state of the invention herein.

Referring to FIGS. 5 and 6, wherein the axle center of the transmission gear axle (5) is penetrated to define the first shaft hole (511) of smaller hole diameter and the second axle hole (512) of larger hole diameter; on the hole wall of the second axle hole (512), the first by-pass hole (513) directly connecting with the first shifting gear (54) and the second by-pass hole (514) connecting with the second shifting gear (55) are disposed; interlocking beads (515) are also respectively inserted in the first by-pass hole (513) and the second by-pass hole (514); on the shifting shaft rod (52), a convex step (521) is formed to adapt to the hole diameter of the second axle hole (512); an elastic recoil element (522) is inserted in the first axle hole (511); a crown bar (53) pressed by another elastic recoil element (531) is mounted on the distal end of the shifting shaft rod (52); an end shaft cover (532) is housed at the distal end of the crown bar (53); the elastic recoil element (531) presses against the end shaft cover (532) for pushing the shifting shaft rod (52) to the positioning location, as shown in FIG. 5; when the shifting shaft rod (52) is positioned, its step (521) can push the interlocking bead (515) in the first by-pass hole (513) to interlock with the first shifting gear (54); at this time, the power of the power gear axle (23) will be outputted via the high speed gear (231) through the transmission gear axle (5) driven by the first shifting gear (54) to maintain the routine driving speed; however, when the operator depresses the shifting shaft rod (52), as shown in FIG. 6, the step (521) of the shifting shaft rod (52) will push the interlocking bead (515) in the second by-pass hole (514) to interlock with the second shifting gear (55); at this time, the power of the power gear axle (23) will be outputted via the low speed gear (232) through the transmission gear axle (5) driven by the second shifting gear (55) to achieve the output of torsion bigger than that of the routine driving speed.

The invention herein of a torsion shift structure for the means of transportation, with a transmission gear axle mounted between the power gear axle and the selective speed gear axle of the transmission structure of the means of transportation; the transmission gear on the transmission gear meshing the selective speed gear axle; a high speed gear and a low speed gear formed on the power gear axle; the first and the second shifting gears housed on the transmission gear axle and meshing respectively the high speed gear and the low speed gear; furthermore, a shifting shaft rod inserting through the transmission gear axle for respectively controlling the interlocking between the first and the second shifting gears and the transmission gear axle to change the driving of the high and the low speed gears and the transmission gear axle and to further achieve the output of the torsion shifting, provides another better and applicable method for the transmission structure for the means of transportation and complies with all new patent application requirements and is hereby submitted to the patent bureau for review and the granting of the commensurate patent rights.

What is claimed is:

1. A torsion shift structure for a differential gear set mounted inside an axle housing seat for driving axles on two sides, including a power element for driving a power gear axle and a selective speed gear axle for transmitting power to a main turning wheel in the differential gear set, and comprising:

a transmission gear axle mounted between the power gear axle and the selective speed gear axle, including a transmission gear on the transmission gear axle meshing with selective speed gears on the selective Speed gear axle; a high Speed gear and a low Speed gear on the power gear axle; first and second shifting gears on the transmission gear axle meshing respectively with the high speed gear and the low speed gear; a shifting shaft rod inserted through the transmission gear axle for controlling interlocking between the first and second shifting gears on the transmission gear axle to change the driving of the high and the low speed gears on the power gear axle; an axle center of the transmission gear axle defining a first shaft hole of a first hole diameter and a second axle hole of a second hole diameter larger than the first hole diameter; a first by-pass hole directly connecting the second axle hole with the first shifting gear; a second by-pass hole connecting the second axle hole with the second shifting gear; interlocking beads in the first by-pass hole and the second by-pass hole; the shifting shaft rod having a convex step in the second axle hole; a first elastic recoil element in the first shaft hole; a crown bar pressed by a second elastic recoil element mounted on a distal end of the shifting shaft rod; and an end shaft cover at the distal end of the said crown bar; wherein the second elastic recoil element presses against the end shaft cover for pushing the shifting shaft rod to a positioning location.

* * * * *